(No Model.)
T. G. SPRINGER.
PROCESS OF AND APPARATUS FOR MANUFACTURING GAS.
No. 284,985. Patented Sept. 11, 1883.
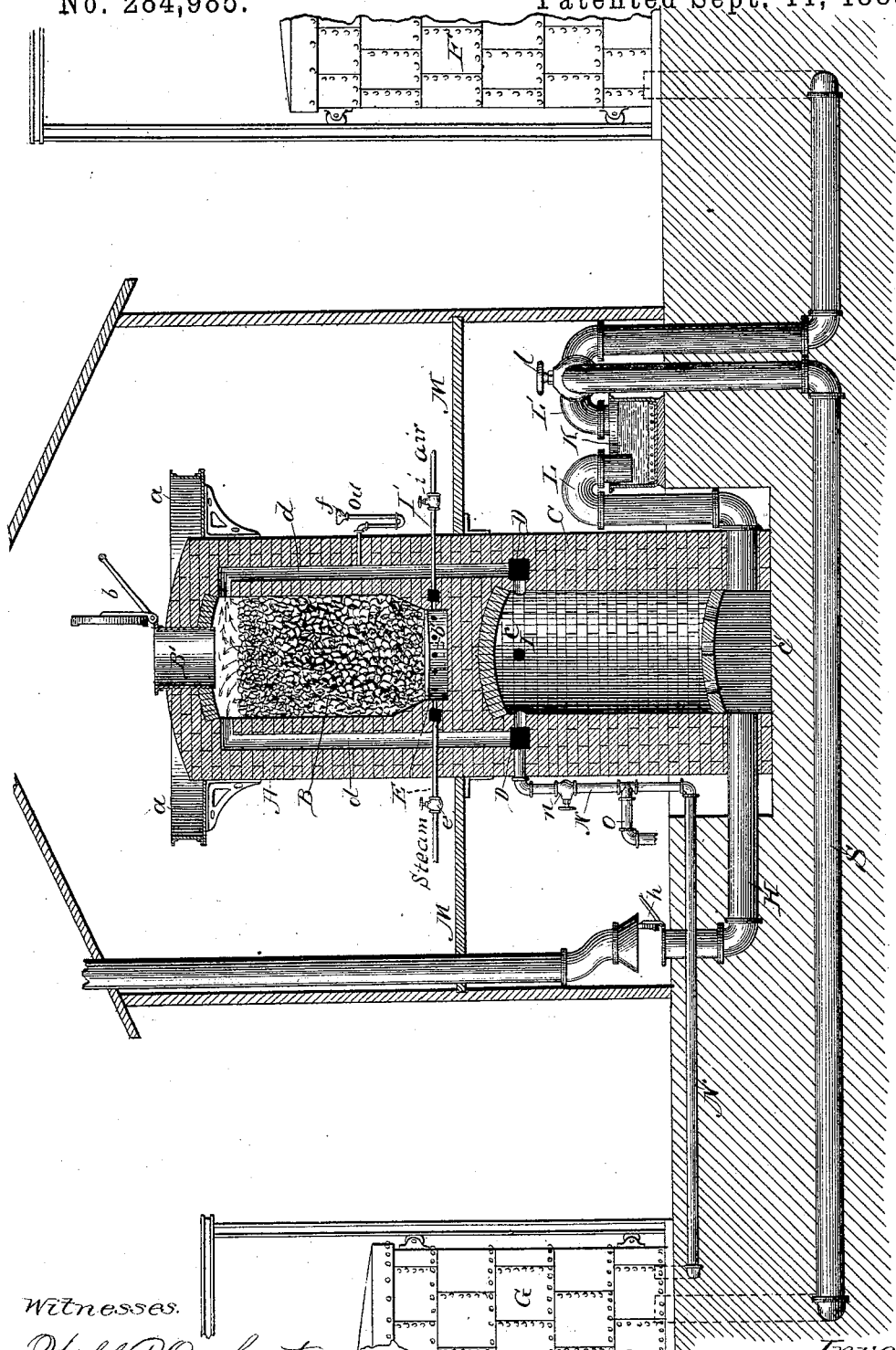
Witnesses.
Inventor:
Theodore G. Springer

UNITED STATES PATENT OFFICE.

THEODORE G. SPRINGER, OF NEW YORK, N. Y.

PROCESS OF AND APPARATUS FOR MANUFACTURING GAS.

SPECIFICATION forming part of Letters Patent No. 284,985, dated September 11, 1883.

Application filed July 23, 1883. (No model.)

*To all whom it may concern:*

Be it known that I, THEODORE G. SPRINGER, of the city, county, and State of New York, have invented certain new and useful Improvements in Processes of and Apparatus for Manufacturing Gas, of which the following is a specification.

This invention relates to the manufacture of heating and illuminating gas, and is an improvement in the process of producing gas by the decomposition of steam in contact with incandescent carbon, enriching the resulting gases with liquid hydrocarbon, and combining and fixing the gases and oil vapors in a heated chamber, as usually carried out in cupola generating-furnaces.

The object of the invention is to produce a high-grade fixed illuminating-gas of more uniform quality than could be produced by the cupola process, as heretofore conducted, and at the same time save and utilize the heat and heating-power of the hot products of combustion for heating the refractory material in the gas-fixing chamber, and thus make a very fine uniform quality of gas at comparatively small expense.

Heretofore in the manufacture of gas by one process an illuminating-gas has been produced by a complicated series of operations, requiring a great deal of apparatus, consuming much time, entailing great loss of heat, and being very expensive to operate. In this process all the hot products of combustion, containing valuable carbonic oxide, arising from the fuel at the time the air-blast is admitted for raising the carbon to incandescence are wasted, being allowed to burn freely at the top of the cupola. The entire yield of gas produced by the decomposition of steam in the hot carbon in the cupola is cooled and stored in a holder before being carbureted. The cold gases are then drawn from the holder and carbureted in a separate apparatus, which must be specially heated, and the carbureted gases are then combined and fixed in benches of retorts, which must be independently fired and cared for by skilled men to keep the heats just right for making a good quality of gas without destruction and waste of oil. This process is objectionable, by reason of being wasteful and expensive, as seen by the operations above detailed.

By another process a very good illuminating-gas is produced in a simple economical way in a single generating apparatus, in which the heat of the products of combustion, and the combustible gas thereof, and the heat of the water-gas are utilized and turned to account for cheapening the manufacture of rich illuminating-gas. In this process the products of combustion, containing a valuable per cent. of carbonic oxide, arising from the fuel in the generator at the time the air-blast is admitted for raising such fuel to incandescence are burned while hot in a fixing-chamber containing refractory material for storing up the heat, to be subsequently used for combining and fixing carbureted gas. Steam is decomposed in the incandescent fuel, producing carbonic oxide and hydrogen, and these gases are enriched or carbureted with liquid hydrocarbon—such as petroleum or any of its distillates—on its passage to or in the fixing-chamber, and the mixed gases and vapors are then combined and converted into a fixed gas by passage through the heated refractory brick-work in the fixing-chamber, these operations being continued till the bed of fuel and the fixing-chamber are reduced too low in temperature for properly performing their functions of decomposing steam and fixing carbureted gases when the steam and oil are turned off and the apparatus reheated by the admission of air-blasts to the generator and fixing-chamber. In this process gas is generated very rapidly, immense volumes being generated in a very short time, and this is especially the case at the beginning of a run, when steam is first admitted to the incandescent fuel. At this time it is impossible to carburet the carbonic acid and hydrogen to just the right degree to make the finest illuminating-gas, on account of the high temperature of the carbonic oxide and hydrogen generated and the high heat of the fixing-chamber, where the gases resulting from the decomposed steam are carbureted with hydrocarbon oil. Therefore it is found preferable, for the first few minutes of the run, to allow the decomposition of steam into carbonic oxide and hydrogen to go on without the admission of oil. Then the oil is admitted gradually until the gas produced shows by the test-burner the quality of illuminating-gas desired. Up to this time the gas produced is of an inferior illuminating quality, and it is found preferable not to pass it into the storage-holder for illuminating-gas, but to by-pass it and conduct it into a separate holder, which may be called the "storage-holder for low-grade gas," for future treatment to make the finest quality of illuminating-gas. Again, at the last part of the run the temperature of the generating and fixing chambers becomes too low to fully decompose the steam and perfectly combine and fix the carbureted gas. At that period the oil is shut off and the decomposition of steam allowed to continue until all the oil is carried out of the cupola. The gas produced after the oil is shut off will be of an inferior illuminating quality, and is also passed into the storage-holder for low-grade gas, to mingle with the poor gas from the first part of the run for future treatment with it to make gas of the finest quality. It is thus seen that the volumes of gas produced at the commencement and close of the run are cut off from the main product and stored in a separate side holder for future treatment. The main product is a fixed illuminating-gas of the finest quality, and is passed direct from the cupola to the scrubbers and purifiers, and thence into the storage-holder for illuminating-gas to be sent to the consumer.

In operating my generating apparatus it is advantageous to raise the fuel in the decomposing and generating chamber to a high state of incandescence, for in such state it is much more effective for decomposing steam into hydrogen and carbonic oxide without admixture with deleterious carbonic acid, which results when the heat runs too low; but in thus highly heating the fuel the fixing-chamber is apt to become so highly heated as to injuriously affect the oil by destructively decomposing it and forming lamp-black at the commencement of the run for producing illuminating-gas. For this reason the steam is admitted into the cupola for a few minutes before the oil. The decomposition of steam reduces the fixing-chamber to the proper temperature for the oil, and the quantity thereof admitted is correctly adjusted to the water-gas being generated, so as to carburet it to the desired candle-power, and, the temperature being right, a homogeneous fixed illuminating-gas is produced of the finest quality, which is stored in the distributing-holder for illuminating-gas. As soon as the gas produced toward the end of the run begins to show a yellow or smoky flame at the test-burner it is cut off from the main distributing-holder and by-passed to the holder for low-grade gas. The oil is also then shut off, the injection of steam into the fuel of the decomposing-chamber being allowed to continue until all the oil in the fixing-chamber is taken up. Then the steam is shut off, and the decomposing-chamber and the refractory brickwork in the fixing-chamber are again heated up by internal combustion of the fuel and resulting gaseous products. The manufacture of gas is then resumed, as before described; but after the first end of this run has been stored in the low-grade holder, and the heat in the fixing-chamber found to be just right, a portion of the low-grade gas is drawn from the side holder and conducted, either alone or with the hot gas being at that time produced in the decomposing-chamber, into the fixing-chamber, and there carbureted and converted into a homogeneous gas of the desired candle-power, and stored in the distributing-holder.

During every run for making illuminating-gas the first and last inferior volumes of gas are cut off from the distributing-holder, and at a suitable time, when the heat in the fixing-chamber is found to be right, the low-grade gas is drawn back to the fixing-chamber, and there carbureted and fixed with the hot carbonic oxide and hydrogen being at that time produced by the decomposition of steam in the decomposing-chamber. During the time at which the low-grade gas is returned to the fixing-chamber the quantity of steam admitted to the decomposing-chamber is suitably reduced, so that the entire quantity of gas sent into the fixing-chamber may be perfectly carbureted and fixed, so that only the finest quality of illuminating-gas is sent to the distributing-holder.

My invention is not limited to the exact details above stated, but includes the improvement of the low-grade gas by carbureting and fixing in any way—as, for instance, in independent and separately fired cupolas or benches of retorts—and in this latter method a regulated stream of the gas is passed through a carbureter, where it is carbureted, and thence into and through retorts externally heated and maintained at the proper temperature for combining and fixing the mingled gases and vapors, and forming a homogeneous gas, which is stored in the main distributing-holder for illuminating-gas. By this process it is seen that the heat is saved and utilized in heating the combining and fixing chamber, and that a large portion of the hydrogen and carbonic-oxide gases generated are carbureted while hot and converted into a homogeneous fixed illuminating-gas of fine quality directly in the generating apparatus, so that it requires no further treatment, except for purification, before storage in the distributing-holder. It is also seen that the small per cent. of low-grade gas produced is separately treated, so that it is raised to the proper standard of uniform candle-power and fixedness before being passed to the distributing-holder, thus insuring for the consumer at all times a fine quality of gas.

It is obvious that the low-grade gas stored in the side holder may be used for the purpose of heating, or for power in gas-engines, without further treatment, as it is well suited for both purposes.

Having stated the nature and object of my invention, I will now more particularly describe it in connection with the accompanying drawing, illustrating an apparatus suitably constructed for carrying out my improved process, and also embracing a novel construction and arrangement of parts forming part of my invention.

The figure of drawing shows a vertical section of the generating-cupola with the connected holders in elevation.

The cupola A, containing the generating and fixing chambers, is built with walls of fire-bricks, or tiles covered by riveted plates of boiler-iron. The decomposing and generating chamber B for containing the carbonaceous fuel is preferably placed at the top of the cupola, and is separated from the fixing-chamber C, placed below, by a solid brick arch, c. Chamber B has at the top a fuel-charging chute, B', and is provided with a tight-fitting lid, b, and at the bottom is an ash-pit having a door, and separated from the fuel-chamber by a grate, b'. The gas-discharge flues d, of which there may be three, or more, lead from the top of chamber B down through the walls thereof to the annular flue D, in the wall, near the top of chamber C, and from this flue numerous inlet-passages open into the top of chamber C for evenly distributing the gas in such chamber. An air-blast pipe, I, enters the top of chamber C for supplying air to burn the combustible gas in the hot products of combustion for heating the brick-work in chamber C. An air-blast pipe, I', having a valve, i, and a steam-inlet pipe, E, having a valve, e, both connect with the ash-pit of the decomposing-chamber. A trapped oil-supply pipe, f, connects near the top of one of the gas-discharge flues. The fixing-chamber C is to be filled with refractory brick-work, laid in the form of regenerators, and supported on an open-work arch, c', near the bottom. Below the arch a gas-eduction pipe, L, connects and leads to the water-seal and wash box K; and the smoke-flue H, having a tight-fitting cap or lid, h, also connects below the arch and leads to a suitable place of discharge. Pipe L' connects the seal-box with the distributing-holder F for illuminating-gas, and the pipe has a three-way valve, l, at which point connects the by-pass pipe S, leading to the small storage-holder G for low-grade gas. A pipe, N, having a valve, n, leads back from holder G to the annular distributing-flue D at the top of chamber C for the purpose of returning low-grade gas to be carbureted and fixed.

A branch pipe, O, leading from pipe N, is provided for conducting gas to a separate carbureter, and from which it is passed to heated retorts and fixed. This or another pipe may conduct gas away for heating purposes, or to a gas-motor. The floor M extends around the cupola, near the base of the generating-chamber, and a staging, a, extends around the top of the cupola for receiving the coal to be charged into the decomposing and generating chamber. The cupola is erected upon a brick or stone foundation, and preferably located in a pit on account of its height. The decomposing-chamber is preferably located at the top of the cupola, for convenience of charging it with fuel, and for convenience in thrusting in the clinkering-bars to clean the side walls of the furnace.

In operating the apparatus for the manufacture of gas a fire is first kindled in chamber B, the lid b at the top being at first left open, and the fire allowed to burn by natural draft till a small body of coal is ignited. Then lid b is closed and the air-blast admitted till a body of fuel several feet thick (which is gradually fed in) is raised to incandescence. During the application of the air blast the products of combustion containing combustible carbonic oxide are passed through flues d and burned while hot in the fixing-chamber C by the admission of an air-blast at I. The heat is stored in the brick-work, and the spent products of complete combustion are conducted away at the bottom through smoke-flue H, the lid h thereof being at the time open for that purpose. A bed of fuel several feet thick having been raised to a state of incandescence, and the fixing-chamber having been suitably heated, the air-blasts are shut off, the lids b and h are tightly closed, then steam is admitted by pipe E into the ash-pit, and passed thence up through the incandescent fuel in chamber B, where decomposition rapidly takes place, resulting in the production of carbonic oxide and hydrogen, which are passed down through the vertical flues d into the fixing-chamber. Soon after the generation of gas commences hydrocarbon oil is admitted to only one of the flues d in sufficient quantity to soon reduce the temperature of the flue and the gas passing through it to a degree at which the oil is not burned. The gas passed through the remaining flues is carbureted by the rich vapors from the vaporizing-flue in the top of the superheater. From the beginning of the run, and until the heat is just right and the proper quantity of oil is admitted for carbureting the gas to the desired candle-power, the entire product, being of a low grade as regards illuminating-power, is, after passing the seal-box, cut off from the holder F by turning the three-way valve l and conducted into the small storage-holder G for future treatment. As soon as a fine quality of illuminating-gas passes from the fixing-chamber, as shown by the test-burner, the three-way valve l is turned so as to pass it into the large distributing-holder F, and the flow into this holder is continued as long as a good quality of gas is produced. When, however, toward the end of the run, the flame of the gas turns yellow or smoky, the valve l is again so turned as to discharge the gas through pipe S into holder G, and the oil is immediately shut off, the steam being admitted to the fuel till the resulting gases have taken up and combined with all the oil and vapors remaining in the vaporizing-flue and fixing-chamber, and when the test-flame shows that only very poor thin gas is given off the steam is shut off. The decomposing and generating chamber and the fixing chamber are again heated up in a well-known manner, and, after being properly heated, the manufacture of gas is resumed by the decomposition of steam, and by carbureting and fixing the resulting gases, the product for the first part of the run, consisting of low-grade gas, being sent to the small storage-holder, as before explained. When the fixing-chamber has been tempered down to a good working-heat, the valve in return-pipe N is opened and a stream of low-grade gas is conducted back into the top of the fixing-chamber, and there carbureted with oil vapors, and while such gas is being returned to the fixing-chamber the quantity of steam admitted to the decomposing-chamber is adjusted so that no more gas is produced than can be properly carbureted with the gas returned to the fixing-chamber, and the whole product converted into a good fixed illuminating-gas. In each succeeding run for the manufacture of gas the first and last volumes of the product are cut off from the large distributing-holder and stored separately in the small holder, and during each run, when the heats are right, the low-grade gas is drawn back, carbureted, and fixed so that only a fine even quality of fixed illuminating-gas is sent to the distributing-holder. As before stated, the low-grade gas may be taken off by pipe O and separately carbureted, and then combined and fixed in benches of heated retorts, or a separately-heated cupola; or the low-grade gas may be used for heating or for running motors.

Having described my invention, what I claim, and desire to secure by Letters Patent, is—

1. In the manufacture of gas in cupola-generators, the process of making and storing a uniform quantity of fixed illuminating-gas, which consists in decomposing steam in contact with incandescent carbonaceous fuel, carbureting and fixing the resulting gases in a heated chamber, and passing the low-grade product generated during the first part of the run into a side or storage holder, then, when the heat is right and the oil admitted is regulated so as to carburet the gas to the desired candle-power, passing the high grade of illuminating-gas into a separate distributing-holder till a low grade of gas begins to flow from the generator, then cutting off the flow to the distributing-holder and passing the product till the end of the run into the side or storage holder for separate use or treatment.

2. The process of manufacturing illuminating-gas, which consists in raising a body of carbonaceous fuel to incandescence by a blast of air, burning the resulting gaseous products and storing the heat in a body of refractory material, then decomposing steam in the heated fuel, carbureting the resulting hot gases, and combining and fixing the carbureted gases by passage through the heated refractory material, cutting off and storing the first low-grade gas separately till the heat of the fixing-chamber and the quantity of carbureting-fluid admitted are properly regulated, so that a fine quality of illuminating-gas is produced, then passing such gas as long as produced to the distributing or service holder, then at the last part of the run again cutting off the low-grade gas and storing it separately, continuing the manufacture by reheating the decomposing and fixing chambers, generating gas and storing the high and low grades separately, and by drawing from the storage-holder the low-grade gas, carbureting the same and fixing it in heated chambers at the proper temperature for making high-grade illuminating-gas, and passing such gas to distributing-holder for illuminating-gas, whereby a large quantity of heat is saved and utilized, and only a high-grade fixed illuminating-gas is stored in the distributing-holder.

3. The process of manufacturing illuminating-gas, which consists in heating a body of fuel by an air-blast, and heating a fixing-chamber by means of the resulting hot gaseous products, then decomposing steam in the fuel, carbureting the resulting gases and combining and fixing them in the heated fixing-chamber, cutting off and storing separately the low-grade gas produced at the first and last periods of the run, and, while the heat is right and the quantity of oil admitted is properly regulated to carburet the gas to the required candle-power, passing the resulting high-grade illuminating-gas to the distributing or service holder, then, in the continuation of manufacture during subsequent runs, when the fixing-chamber is tempered down to the right degree, drawing from the storage-holder low-grade gas, and returning it to the fixing-chamber of the generating-cupola, and there carbureting and fixing it, together with the water-gas being at that time generated in the decomposing-chamber, and passing the resulting high-grade illuminating-gas to the distributing-holder, whereby heat is economized and high-grade fixed illuminating-gas only is passed to the distributing-holder.

4. The cupola generating-furnace, having the decomposing and the fixing chambers, and provided with the connecting-pipes for air, steam, and oil, in combination with the distributing-holder for illuminating-gas, the storage-holder for low-grade gas, pipes connecting such holders with the generating-cupola, and a return-pipe from the storage-holder to the fixing-chamber of the cupola, whereby low-grade gas may be returned to the cupola and there carbureted and fixed.

5. A gas-generating cupola constructed with the fuel and decomposing or generating chamber at the top, and the fixing-chamber for combining and fixing the carbureted gas at the bottom, just below the generator, so that the generating-chamber can be readily fed with fuel and cleaned of clinker.

6. A gas-generating cupola constructed with the fuel and decomposing chamber at the top, the fixing-chamber containing refractory material at the bottom, and with two or more gas-discharge flues or pipes passing from the top of the fuel-chamber down to the top of the fixing-chamber, in combination with an oil-inlet pipe, connecting with one of the gas flues or pipes, the gas and smoke-eduction pipes leading from the fixing-chamber, and the connecting-pipes for air and steam, as and for the purpose described.

In testimony that I claim the foregoing as my invention I have signed my name in presence of two subscribing witnesses.

THEODORE G. SPRINGER.

Witnesses:
 G. W. NORTHRUP, Jr.,
 WM. C. GRANT.